United States Patent [19]

Ueda

[11] Patent Number: 5,035,555
[45] Date of Patent: Jul. 30, 1991

[54] DEVICE FOR SETTING WORKPIECE TO POSITION

[75] Inventor: Hiroshi Ueda, Ikoma, Japan

[73] Assignee: Ueda Engineering Kabushiki Kaisha, Nara, Japan

[21] Appl. No.: 568,097

[22] Filed: Aug. 14, 1990

[30] Foreign Application Priority Data

Sep. 14, 1989 [JP] Japan .................... 1-108140[U]

[51] Int. Cl.⁵ .............. B23B 49/00; B27B 27/10; B23C 1/06
[52] U.S. Cl. ..................... 409/218; 51/239; 83/468; 269/303; 269/315
[58] Field of Search .......... 409/218, 220; 279/1.5; 408/241.5; 82/153; 29/65; 33/568, 573, 613, 556; 51/216 R, 217 R, 239; 269/10, 303, 315, 318, 297, 300; 144/253 A, 306; 83/468, 467 A

[56] References Cited

U.S. PATENT DOCUMENTS

| 390,515 | 10/1888 | Owen | 269/318 |
|---|---|---|---|
| 3,274,689 | 9/1966 | Schott | 269/303 |
| 3,555,916 | 1/1971 | Santy | 33/368 X |
| 3,750,618 | 8/1973 | Griebenow | 409/218 X |
| 3,827,686 | 8/1974 | Storkh | 269/315 |
| 3,961,557 | 6/1976 | Jezowski | 409/218 |
| 3,994,484 | 11/1976 | Schorr | 269/315 |
| 4,693,158 | 9/1987 | Price | 83/468 |
| 4,877,359 | 10/1989 | Kolacek | 409/218 |

FOREIGN PATENT DOCUMENTS

| 102546 | 6/1984 | Japan | 409/218 |
|---|---|---|---|
| 644781 | 8/1984 | Switzerland | 269/315 |
| 420431 | 8/1974 | U.S.S.R. | 269/315 |

Primary Examiner—William Briggs
Attorney, Agent, or Firm—Koda and Androlia

[57] ABSTRACT

A device for setting a workpiece to position comprising a rod securely fixed at one end to a workpiece backing plate and back and forth movably fitted in a support stand, a dial threadedly secured to a threaded portion formed on a rear peripheral edge portion of said support stand, and a stopper provided at the rear end of said dial which is connected to said rod and which operates to regulate the movement of said workpiece backing plate by abutting against the rear end face of the dial, whereby the movement of the workpiece backing plate can be set to a value proportional to the setting of the dial.

5 Claims, 4 Drawing Sheets

DEVICE FOR SETTING WORKPIECE TO POSITION

BACKGROUND OF THE INVENTION

1. Field of the Invention

This invention relates to a device for setting workpiece to position of the type which is mounted to a machining apparatus, such as a double-head side milling machine, in setting the width of cut or the like necessary for cutting the workpiece to the desired size.

2. Description of the Prior Art

A prior art device for setting workpiece to position of this type is shown by way of example in FIG. 4 (a).

The prior art device shown includes workpiece mounting plates 25, 25 for placing thereon a workpiece 24 to be cut by cutting tools 23, 23 of a double-head side milling machine, and a workpiece backing plate 26 rotatably attached through a pin 27 to one of the mounting plates 25, 25 and held in a desired position.

In such setting device, the backing plate 26 is utilized as reference position for workpiece location in such a manner that one end face of the workpiece 24 placed on the workpiece mounting plates 25, 25 is brough in abutment against the backing plate 26, whereby the required width of cut can be set as such. When the end face of the workpiece 24 is to be cut, the backing plate 26 is turned rearward for diversion as shown in FIG. 4 (b), so that a cutting edge 28 can be suitably prevented from contact with the workpiece backing plate 26.

However, the above described prior art device has a disadvantage that since the backing plate 26 rotatably attached by the pin 27 is stationarily disposed as shown in FIG. 4 (b) so that it is unshiftable for adjustment in the directions of arrow I, the width of cut $L_1$ with respect to the workpiece 24 is constantly fixed and cannot be varied as desired.

With the prior art device, therefore, it is impracticable to perform the workpiece cutting to any width of cut other than the predetermined one, and this poses the problem of lack of flexibility in use.

SUMMARY OF THE INVENTION

The prior art to which this invention is directed embraces not only devices for setting a workpiece to position which are applicable to aforesaid double-head side milling machine, but also those applicable to other types of machining apparatuses, and it is a primary object of the invention to provide a setting device which enables accurate and easy setting of the workpiece to position for cutting the workpiece to the desired size and which has greater flexibility for use and improved functional characteristics.

Unlike the aforesaid prior art arrangement in which the workpiece backing plate is stationarily disposed, the device of the invention has a workpiece backing plate shiftably provided for position adjustment, whereby it is intended to solve the foregoing problem with the prior art.

Thus, according to the invention there is provided a device for setting a workpiece to position which comprises a rod 3 securely fixed at one end to a workpiece backing plate 2 and back and forth movably fitted in a support stand 5, a dial 7 threadedly secured to a threaded portion 6 formed on a rear peripheral edge portion of said support stand 5, and a stopper 9 provided at the rear end of said dial 7 which is connected to said rod 3 and which operates to regulate the movement of said workpiece backing plate 2 by abutting against the rear end face of the dial 7, whereby the movement of the workpiece backing plate 2 can be set to a value proportional to the setting of the dial 7.

In the workpiece position setting device of the foregoing arrangement, the dial 7 which is threadedly fixed to the rear peripheral edge portion of the support stand 5 is internally threaded so that when it is turned for dimension setting, the rear peripheral edge portion of the support stand 5 is moved in proportion to the amount of dial turn. Accordingly, the stopper 9 held in abutment against the rear end face of the dial is moved concurrently.

Thus, the workpiece backing plate 2 fixedly connected through the rod 3 to the stopper 9 is shifted concurrently. For accurate setting to position of the workpiece backing plate 2 shifted in manner as above mentioned, the stopper 9 at the rear end of the rod 3 comes in abutment against the rear end face of the dial 7 to thereby prevent the advance of both the rod 3 and the backing plate 2. The backing plate 2 is thus set to position.

The dial 7, threadedly fixed to the rear peripheral edge portion of the support stand 5, moves back and forth as it turns and accordingly there occurs a change in position of its rear end face against which the stopper 9 abuts. Thus, as a consequence of the change in the position at which the stopper 9 and the dial 7 are in contact with each other, the position at which the advance of both the rod 3 and the workpiece backing plate 2 is prevented is likewise changed. By controlling the dial 7 for back and forth movement in this way, therefore, it is possible to set the position of the backing plate 2 to any desired dimensional setting.

According to the invention, as above stated, a rod supporting the workpiece backing plate is back and forth movably fitted in a support stand and a stopper is connected to the rod, the stopper being operative to regulate the movement of the rod by abutting against a dial threadedly secured to there rear peripheral edge portion of the support stand. This arrangement permits free and accurate change of the position setting of the workpiece backing plate simply by turning the dial to change the position at which the stopper abuts against the dial.

Therefore, the device according to the invention has a definite advantage over the prior art arrangement in that greater flexibility can be obtained in work position setting, the device being thus applicable for use in positioning of various types of workpieces, with increased versatility in use with various kinds of machining apparatuses including milling machines.

According to the arrangement of the invention in which the workpiece backing plate is movable one half the value of the dial setting, the workpiece can be cut over the desired width of cut simply by turning the dial to a value corresponding to the desired width of cut with respect to the workpiece in case where the device of the invention is employed in a double-head side milling machine or the like. This permits easy and convenient setting of the desired width of cut.

DESCRIPTION OF THE PREFERRED EMBODIMENTS

One embodiment of the invention will now be described with reference to the accompanying drawings.

Figure 1:
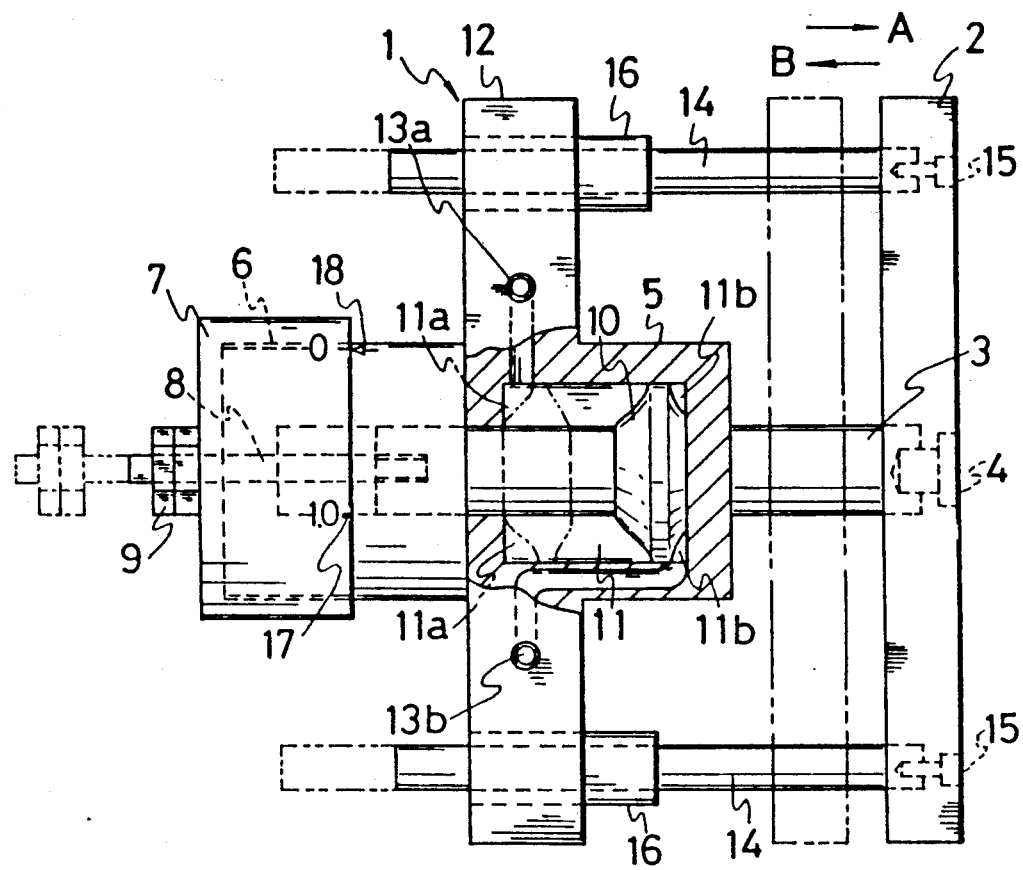
FIG. 1 illustrates one embodiment of the device for setting a workpiece to position according to the invention, FIG. 1 (a) being a plan view thereof, FIG. 1 (b) being a side view of a dial portion.
Figure 1:
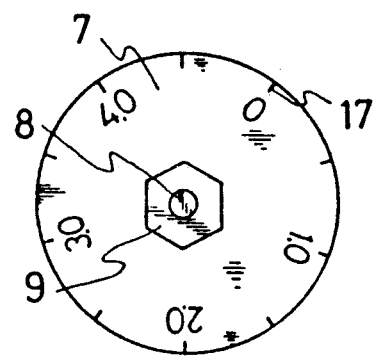

In FIG. 1 (a), a rod 3 is securely connected at one end by a bolt 4 to a workpiece backing plate 2 for guiding one side of a workpiece in contact relation therewith, the other end of the rod 3 being fitted in a support stand 5 constructed as an air cylinder. A piston 10 mounted on the rod 3 is slidably fitted in a cylinder chamber 11 defined within the support stand 5. Through this arrangement the rod 3 is back and forth movable in the directions of arrows A and B as compressed air is supplied and discharged through air feed and discharge openings 13a, 13b bored in a pedestal 12 extending laterally from the support stand 5. It is noted that both the support stand 5 and the pedestal 12 are stationarily mounted in a milling machine which will be hereinafter described. Designated by 14, 14 are guides for guiding the rod 3 for smooth slide movement, the guides 14, 14 being fitted at one end into the workpiece backing plate 2 and securely fastened by bolts 15, 15. Respective other ends of the guides 14, 14 slidably extend through guide receivers 16, 16 provided in the pedestal 12.

The support stand 5 has a threaded portion 6 formed on its rear peripheral edge portion, the thread pitch of which is set at 2.5 mm, for example. A dial 7 is attached to the threaded portion 6 of the support stand 5 in thread engagement therewith, the dial 7 being back and forth movable in the longitudinal directions of the rod 3 by being manipulated for rotation. On the outer periphery of the dial 7, as FIG. 1 (b) shows, there are provided graduations 17 such that one turn of the dial indicates a shift of 5 mm, for example, which graduations are shown opposite the reference line 18 for the support stand 5.

A stopper 9 is disposed behind the dial 7 and is threadedly fixed to a bolt 8 connected to the rear end of the rod 3. The stopper 9 is, by way of example, in the form of a double nut. The stopper 9 is adapted to abut against the rear end of the dial 7 upon each davance of the rod 3.

The construction of the position setting device 1 of the present embodiment has now been described, and nextly the manner of operation of the device 1 will be explained. It is assumed that, as FIG. 2 (a) shows, the device 1 is disposed at one side of one of the two workpiece mounting plates 20, 20 of the double-head side milling machine 19.

A workpiece 21 to be worked is first placed on the mounting plates 20, 20. At an initial stage prior to position setting for the workpiece 21, the stopper 9 of the positioning device 1 is set at a position such that, as FIG. 1 shows, it is in abutment against the rear end face of the dial 7, the rod 3 and workpiece backing plate 2 being thereby prevented from advancing. The workpiece backing plate 2 is set flush with the leading end of a cutting edge 22 of the milling machine 19 as FIG. 2 (b) shows.

Figure 2A:
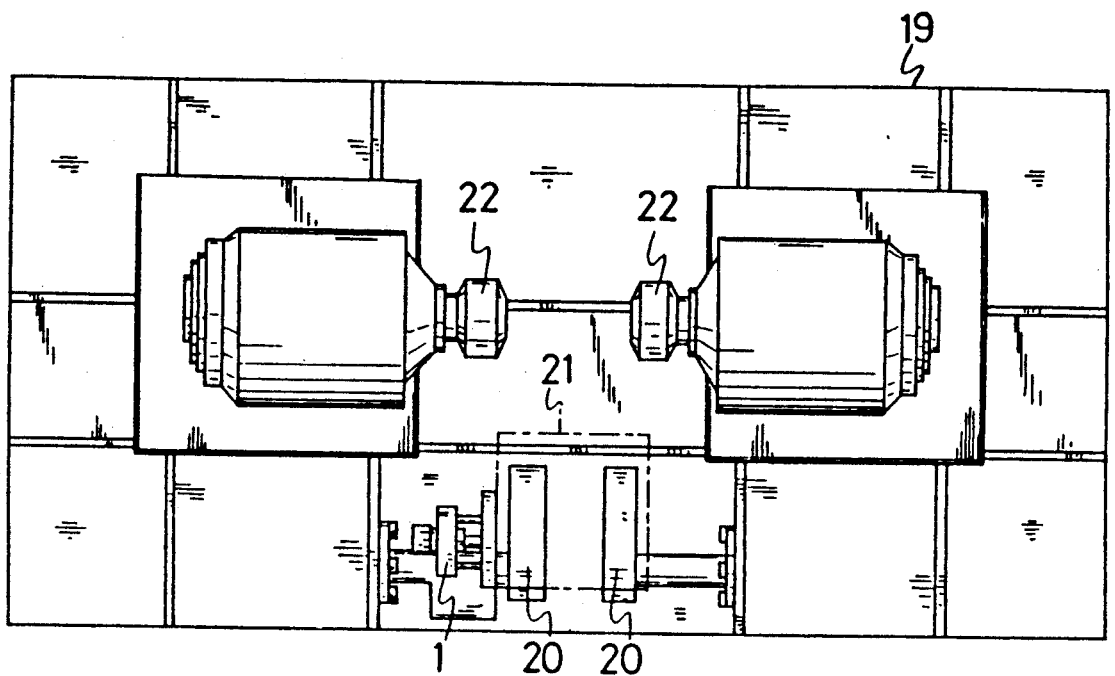
FIGS. 2 (a), 2 (b), and 2 (c) are plan views showing the device when in use.
Figure 2B:
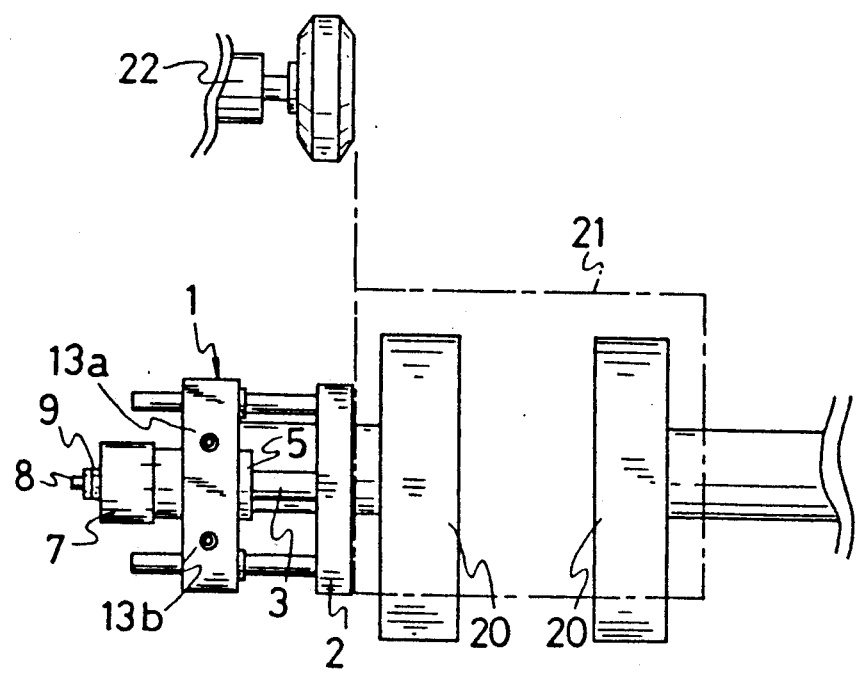
Figure 2C:
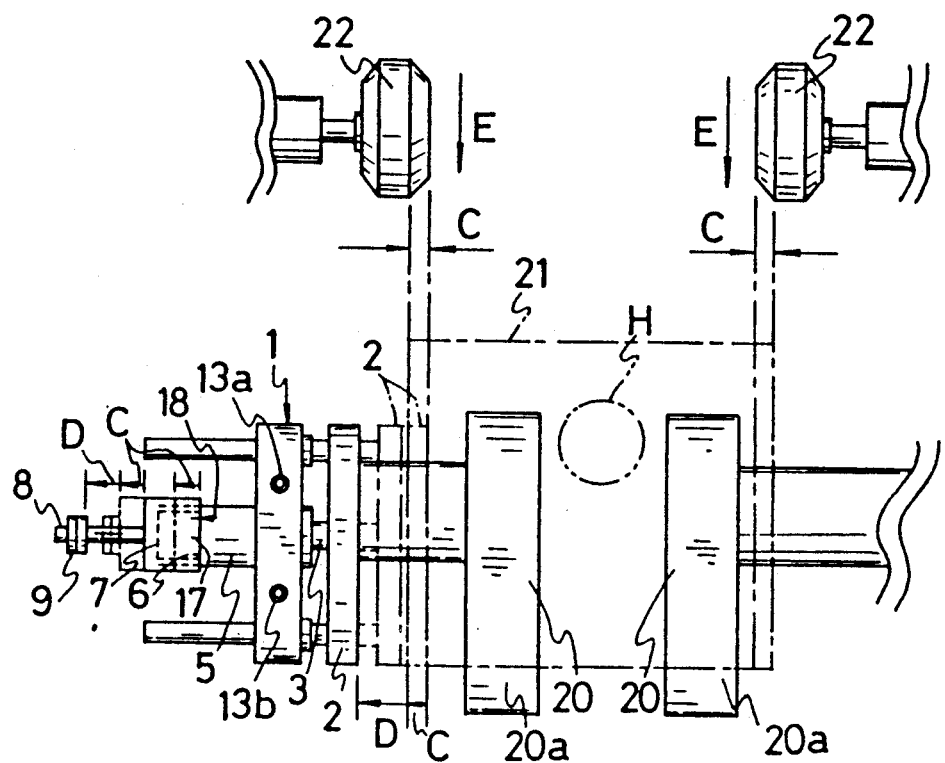

Now, when the workpiece, which has a width of 305 mm, for example, is to be cut to 300 mm, the dial 7 is turned so as for it to move back in the direction of arrow C in FIG. 2 (c). It is noted in this connection that the thread pitch of the threaded portion 6 is set at one half of each graduation. Therefore, if the dial is turned for a full scale graduation of 5 mm equivalent to the desired width of cut for the workpiece 21, the dial 7 is moved back 2.5 mm.

Then, the stopper 9 which is in abutment against the rear end face of the dial 7 is pushed backward and simultaneously the rod 3 and workpiece backing plate 2 which are connected to the stopper 9 via the bolt 8 are also moved back 2.5 mm in the direction of arrow C. In other words, the backing plate 2 is set at a position which is 2.5 mm away backward from the leading end of the cutting edge 22.

Subsequently, the rear end of the workpiece 21 is brought in abutment with abutting portions 20a, 20a of the workpiece mounting plates 20, 20 and simultaneously other side of the workpiece 21 is brought in firm contact with the backing plate 2, whereby the workpiece 21 is set to position. In this connection, compressed air is supplied through the air feed / discharge opening 13a into one side portion 11a of the cylinder chamber 11, there being thus no possibility of positional deviation occurring with respect to the backing plate 2 when the workpiece 21 is brought into firm abutment with the backing plate 2.

Thus, the workpiece 21 can be accurately set to position.

Thereafter, the workpiece 21 is clamped to the mounting plates 20, 20 by means of a clamp H, and the cutting edges 22, 22 are shifted in the direction of arrow E for cutting the workpiece 21 at opposite sides thereof. It is to be understood, however, that during the cutting operation, compressed air should be supplied through the air feed / discharge opening 13b of the support stand 5 into one side portion 11b of the cylinder chamber 11 so that both the rod 3 and the workpiece backing plate 2 are diverted in the direction of arrow D. By virtue of this arrangement the possibility of the backing plate 2 going into undue contact with the cutting edge 22 is eliminated and thus the sides of the workpiece 21 can be properly cut all over.

Further, since the backing plate 2 is moved 2.5 mm or one half of 5 mm, the total width of cut of the workpiece 21, in the widthwise direction of the workpiece 21, the workpiece 21 is cut uniformly by the cutting edges 22, 22 at opposite sides. Accordingly, the load and burden applied to the cutting edges 22, 22 is equalized, which assures longer service life of the cutting edges and eliminates possible unreasonable positional deviation of the workpiece 21 due to the cutting load.

In the foregoing embodiment, the positioning device is employed with a double-head side milling machine, and the amount of shift of the workpiece backing plate 2 is set to ½ of the setting of the dial 7, but the invention is not necessarily limited by this.

Figure 3:
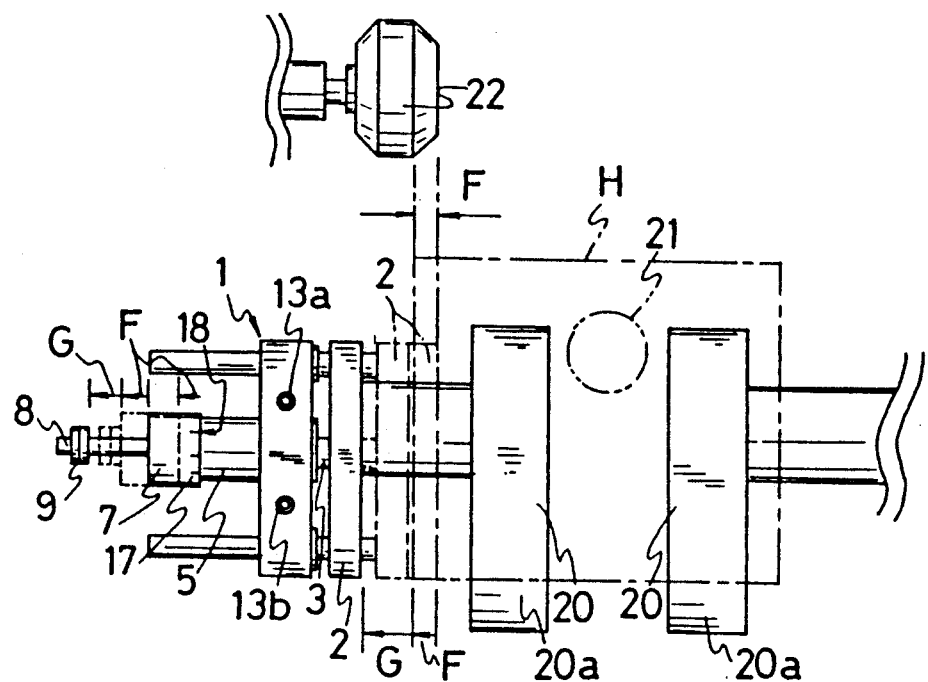
FIG. 3 is a plan view showing another embodiment.
Figure 4A:
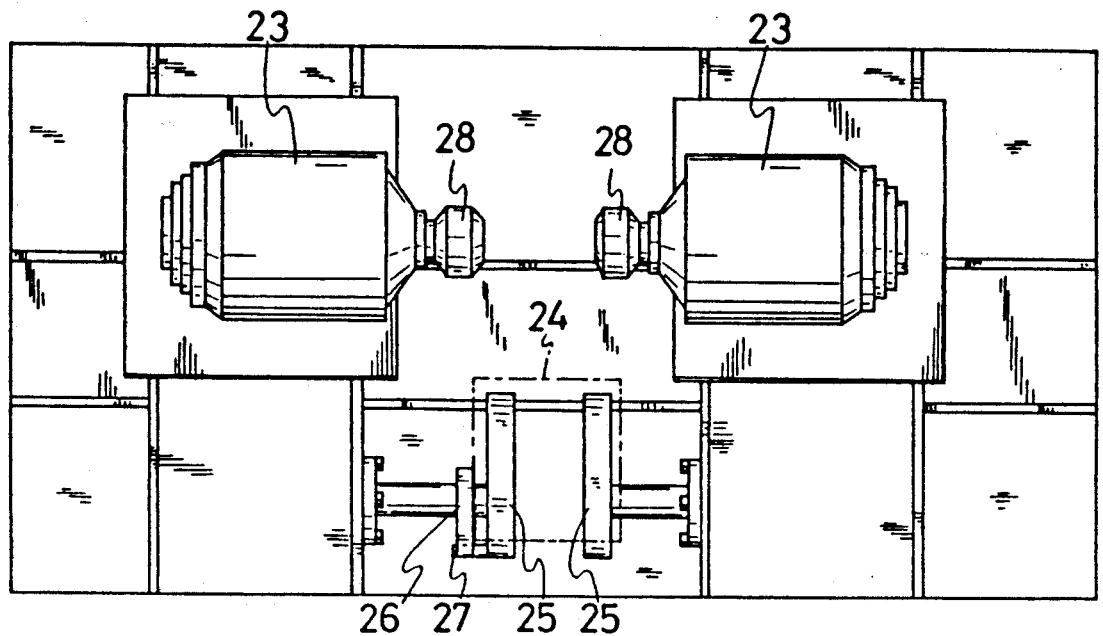
FIGS. 4 (a) and 4 (b) are plan views showing a prior art arrangement.
Figure 4B:
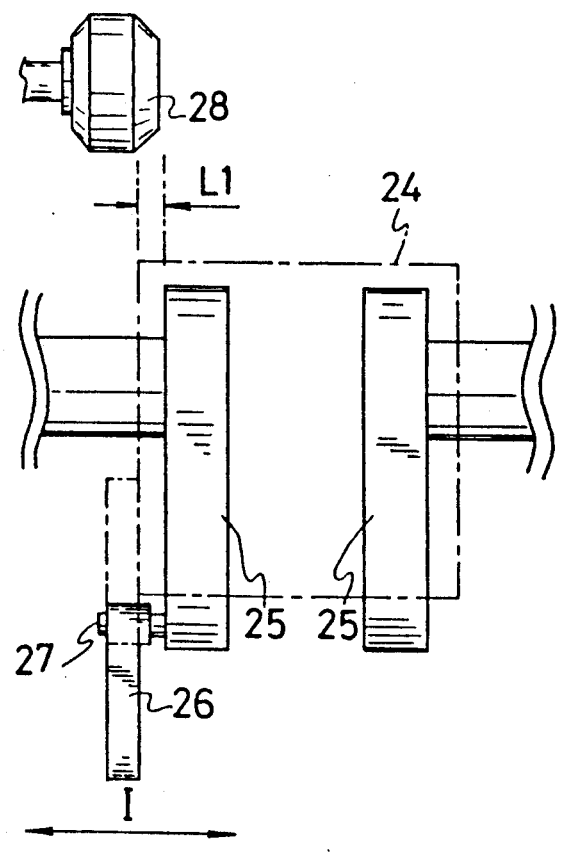

For example, as FIG. 3 shows, the device may be employed with a side milling machine having one cutting edge 22 only. In such case, the setting of the dial 7 should be in exact agreement with the amount of movement of the workpiece backing plate 2. That is, when dial setting is made as above described, the dial 7 shifts in the direction of arrow F, and accordingly both the stopper 9 and the backing plate 2 shift simultaneously in the direction of arrow F. Then the workpiece backing plate 2 is diverted in the direction of arrow G and thus the workpiece can be set to position for the desired cutting.

It is understood that the invention is applicable not only to milling machines of above mentioned types, but also to other cutting apparatuses than milling machines, and various other machining apparatuses, for purposes of workpiece positioning. Uses and manner of use of the device of the invention are not particularly limited.

Configurational features and other details of various parts, such as support stand, rod, and dial, are not limited to those described above. With respect to the support stand, it is only essential that it has a function to back and forth movably support the rod and has a threaded portion formed on its rear peripheral edge portion for mounting a dial in thread engagement therewith. Needless to say, the thread pitch and other details of the dial and threaded portion are not particularly limited. Details as to the arrangement of various parts can be modified or varied in design as desired.

What is claimed is:

1. A device for setting a workpiece to position comprising a rod securely fixed at one end to a workpiece backing plate and back and forth movably fitted in a support stand, a dial threadedly secured to a threaded portion formed on a rear peripheral edge portion of said support stand, and a stopper provided at the rear end of said dial which is connected to said rod and which operates to regulate the movement of said workpiece backing plate by abutting against the rear end face of the dial, whereby the movement of the workpiece backing plate can be set to a value proportional to the setting of the dial.

2. A device for setting a workpiece to position as set forth in claim 1, further comprising a cylinder chamber defined within said support stand, said rod being provided with a piston back and forth movably fitted in said cylinder chamber, and said support stand being formed with a feed port and an exit port for supplying said discharging of fluid into and from the cyclinder chamber for actuating said piston into reciprocating movement.

3. A device for setting a workpiece to position as set forth in claim 1 or 2, wherein said workpiece backing plate is movable one half the value to which the dial is set.

4. A device for setting a workpiece to position as set forth in one of claim 1 or 2, wherein said stopper is a double nut.

5. A device for setting a workpiece to position as set forth in claim 3, wherein said stopper is a double nut.

* * * * *